Aug. 5, 1924.
H. T. LINTOTT ET AL
1,503,541
ELECTRODE HOLDER
Filed Jan. 4, 1923
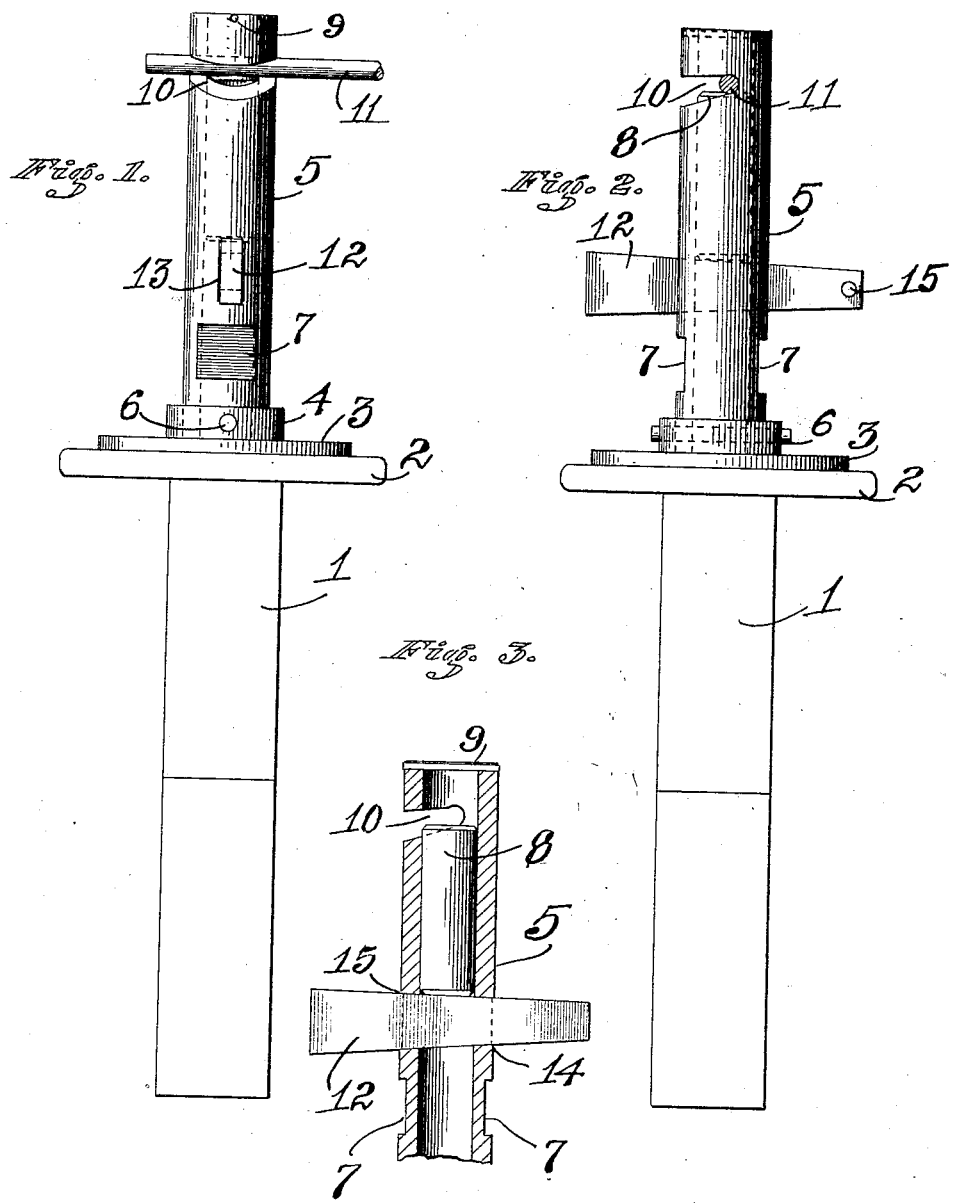
INVENTOR.
H. T. Lintott
H. J. Charbonneau
BY
Munro & Co.
ATTORNEYS.

Patented Aug. 5, 1924.

1,503,541

UNITED STATES PATENT OFFICE.

HENRY THOMAS LINTOTT, OF SOUTH SAN FRANCISCO, AND HENRY JOHN CHARBONNEAU, OF SAN FRANCISCO, CALIFORNIA.

ELECTRODE HOLDER.

Application filed January 4, 1923. Serial No. 610,610.

*To all whom it may concern:*

Be it known that we, HENRY THOMAS LINTOTT and HENRY JOHN CHARBONNEAU, citizens of the United States, and residents, respectively, of South San Francisco, county of San Mateo, State of California, and San Francisco, county of San Francisco, State of California, have invented a new and useful Electrode Holder, of which the following is a specification.

Our invention relates to an electrode holder for use in electric welding and has for its primary object to provide means for holding the electrode so that the same may be conveniently attached to and released from the holder, and to do away with all heretofore accepted parts of the holder which have been subject to destruction due to excessive heat, and which has required a new holder or renewed parts to be provided.

As heretofore provided, screw threaded means have usually been used for effecting a clamping of the electrode to the holder and these provisions have also made it necessary to construct the holder in more or less sensitive or at least easily destroyed parts. Then again, with the heretofore known types of holders it has required time and considerable inconvenience to attach and detach the electrode. According to the construction which we propose these disadvantages are overcome and we are enabled to offer a rugged and practical holder which may be constructed cheaply with a few parts and consequently simple to manipulate and capable of performing its intended use with efficiency.

The preferred embodiment of the invention is illustrated in the accompanying drawing in which Figure 1 is a view in front elevation of our holder, Figure 2 is a view in side elevation, and Figure 3 is a detail vertical section of the holder per se. Referring now to the drawing in detail, we propose to use either the customary handle (1) with its associated parts or else any special construction that may be desirable. However, since the salient features of the invention are in no way dependent upon this part of the holder this particular part is immaterial.

The handle (1) can be provided with the customary flange (2) made to receive the disc (3) which in turn is made with a collar (4) to receive a tubular extension (5). The extension is fixed to the collar by a pin or the like (6). The tubular extension (5), as is customary, may be provided with opposed slots (7) allowing the same to be held by means of a wrench or the like and the same is hollow, at least for the greater part of its length, to receive the pin (8). The pin (8) is made with a diameter substantially that of the hollow of the extension, but the fit should be such as to leave the pin free to slide within the hollow. Presented across the open end of the tube is a key (9) which confines the pin within the hollow and at the same time leaves it free to slide back and forth across the slot (10) which is made in one side of the tube to receive the electrode (11). A wedge shaped key (12) protrudes through slotted openings (13) and (14) in diametrically opposite sides of the tube. The opening (14) is smaller than the opening (13) and since the key (12) is wedge shaped, by forcing the same into the slots a binding effect will be realized which will hold the key in a position to force the pin (8) against the electrode (11) thus securely clamping it in the slot (10). To attach the electrode the key (12) should be pulled out as far as the retaining pin (15) will permit so as to enable the pin to recede within the hollow of the tube to leave an unobstructed space in the slot (10). The electrode is then presented within the slot as best shown in Figures 1 and 2. Then the key (12) is forced inwardly to press the pin (8) against the electrode to clamp the same, and by tapping or striking the large end of the key (12) both the electrode (11) will be tightly clamped and the key will be wedged so to speak in the slots (13) and (14), and there will be no possibility of the electrode becoming loose or dropping out. When it is desirable to release the electrode for other reasons, the small end of the key (12) should be tapped so as to permit the pin (8) to recede away from the slot (10) thus leaving the opening (10) unobstructed.

The device has many manufacturing possibilities and the simple and quick manner that the electrode may be attached or released, leaves the same as a practical solution of the problems involved in devices of this character so that the same can be looked upon as a decided improvement over heretofore known types.

We claim:

1. In a device of the class described, a hollow tubular member, a slot in said member made to receive an electrode, a pin for clamping the electrode in said slot, and a wedging device for actuating the pin.

2. In a device of the class described, a hollow tubular member, a slot in said member made to receive an electrode, a pin for clamping the electrode in said slot, and a wedging device for actuating the pin, comprising a wedge shaped key, slots in diametrically opposite sides of said tubular member to receive said key and said pin being confined in the tubular member between said key and the slot to receive the electrode.

3. An electrode holder of the class described, comprising a hollow tubular member, a pin confined in the hollow of the tubular member, a slot in the side of said member extending into the hollow thereof, an electrode adapted to be received in said slot transversely of the tubular member, and a wedge shaped key extending diametrically through the hollow tubular member for forcing the pin against the electrode and clamping the same in said slot.

HENRY THOMAS LINTOTT.
HENRY JOHN CHARBONNEAU.